United States Patent [19]

Sakazume et al.

[11] Patent Number: 5,212,227
[45] Date of Patent: May 18, 1993

[54] THERMOPLASTIC RESIN COMPOSITIONS

[75] Inventors: Suehiro Sakazume, Fujisawa; Yuichi Orikasa, Yokohama, both of Japan

[73] Assignees: Nippon Petrochemicals Co., Ltd.; Nippon Oil & Fat Co., Ltd., Japan

[21] Appl. No.: 631,388

[22] Filed: Dec. 20, 1990

[30] Foreign Application Priority Data

Dec. 28, 1989 [JP] Japan ................... 1-343857

[51] Int. Cl.$^5$ ............ C08L 23/10; C08L 25/06; C08L 51/06; C08L 23/12
[52] U.S. Cl. .................... 524/504; 525/70; 525/71; 525/73; 525/74; 525/79; 525/80; 525/87
[58] Field of Search .............. 525/70, 79, 80; 524/504

[56] References Cited

U.S. PATENT DOCUMENTS

| | | | |
|---|---|---|---|
| 4,665,131 | 5/1987 | Moriya et al. | 525/277 |
| 4,839,423 | 6/1989 | Moriya et al. | 525/217 |
| 4,879,347 | 11/1989 | Moriya et al. | 525/277 |
| 4,889,888 | 12/1989 | Bassi et al. | 525/70 |
| 4,910,254 | 3/1990 | Johnston | 525/70 |
| 4,923,956 | 5/1990 | Moriya et al. | 525/277 |
| 4,957,974 | 9/1990 | Illenda et al. | 525/70 |

OTHER PUBLICATIONS

Exxon—"Exxon Elastomers for Polyolefin Modification", 1975, pp. 1, 3, 4 & 31–33.

Primary Examiner—Carman J. Seccuro, Jr.
Attorney, Agent, or Firm—Ostrolenk, Faber, Gerb & Soffen

[57] ABSTRACT

There is provided a thermoplastic resin composition which comprises 99 to 1% by weight of a propylene polymer (I), 1 to 99% by weight of a vinyl polymer (II), 0.1 to 100 parts by weight, based on 100 parts by weight of the aforesaid resins (I)+(II), of a multi-phase structure thermoplastic resin (III) which is a graft copolymer comprising 5 to 95% by weight of a propylene polymer and 95 to 5% by weight of a vinyl polymer or copolymer obtained from at least one kind of vinyl monomer, either of the components being formed with a dispersion phase having a particle diameter of 0.001 to 10 μm.

7 Claims, No Drawings

THERMOPLASTIC RESIN COMPOSITIONS

BACKGROUND OF THE INVENTION (1) Field of the Invention

The present invention relates to thermoplastic resin compositions having excellent impact resistance, coating and adhering properties. The compositions can be widely utilized as materials for electrical and electronic parts, machine parts, automobile parts, containers, miscellaneous goods and the like.

(2) Description of the Prior Art

Propylene polymers are reasonable in price and have excellent mechanical properties, moldability, chemical resistance and the like. They are widely used in many plastic molding fields. However, in the propylene polymers the impact resistance, coating and adhering properties of molded articles therefrom are relatively poor, and for this reason, the range of use of such propylene polymers had certain limitations. On the other hand, vinyl polymers are good in coating and adhering properties, but they are poor in chemical resistance. In order to improve these poor properties of the respective resins, a method in which a polypropylene resin is blended with a vinyl polymer such as polystyrene has been proposed. Japanese Patent Unexamined Publication No. 59-217742 describes a process for improving the compatibility of the propylene polymer with the polystyrene by using a modified propylene polymer prepared by using a specific method. Japanese Patent Unexamined Publication No. 64-69651 discloses an improved process for blending the propylene polymer with the ABS resin in which a specific multi-phase structure thermoplastic resin is utilized. However, in the former case, the improvement of the compatibility of the propylene polymer with the polystyrene is not sufficient because of the insufficient graft efficiency of said modified propylene polymer.

Despite the acceptance of the improved compatibility of the propylene polymer with the ABS resin and the improved impact resistance as well as coating properties of molded articles in the latter case, the need still exists for an improved weather resistant of the composition.

SUMMARY OF THE INVENTION

In accordance with the present invention, it has unexpectedly been found that when a specific multi-phase structure thermoplastic resin is additionally blended as a compatibility agent, a thermoplastic resin composition can be obtained in which impact resistance of molded articles indreases, with features of the propylene polymer having good mechanical properties and of the vinyl polymer having excellent coating and adhering properties maintained.

The present invention is directed to a thermoplastic resin composition which comprises:

(I) 99 to 1% by weight of a propylene polymer, (II) 1 to 99% by weight of a vinyl polymer, and (III) 0.1 to 100 parts by weight, based on 100 parts by weight of the aforesaid resins (I)+(II), of a multi-phase structure thermoplastic resin which is a graft copolymer comprising 5 to 95% by weight of a propylene polymer and 95 to 5% by weight of a vinyl polymer or copolymer obtained from at least one vinyl monomer, either of both the components being formed with a dispersion phase having a particle diameter of 0.001 to 10 μm, said graft copolymer being obtained by melting and kneading a graft polymerization precursor (A) which is prepared by copolymerizing at least one vinyl monomer with at least one of radical polymerizable organic peroxides having the general formulae (a) or (b):

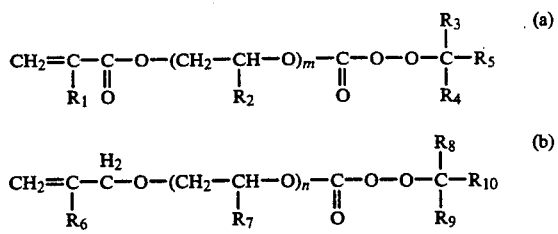

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2, in particles of a propylene polymer.

DETAILED DESCRIPTION OF THE INVENTION

The propylene polymer (I) used in the present invention is similar to the crystalline propylene polymer used in the preparation of the multi-phase thermoplastic resin. Said preparation will be described afterward.

Examples of a propylene polymer (I) used in the present invention include homopolymers or copolymers of propylene with other α-olefins, or copolymers of propylene with polar ethylenically unsaturated monomers (each copolymer composed of over 75% by weight of propylene) are preferable.

Typical examples of the propylene polymer (I) used in the present invention include isotactic polypropylenes, crystalline random propylene-ethylene copolymers, crystalline block propylene-ethylene copolymers, crystalline random propylene-1-butene copolymers, maleic anhydride modified polypropylenes, and mixtures thereof. Other polymers may be mixed thereto provided that features of propylene polymer are not impaired.

The vinyl polymer or copolymer used in the present invention is similar to that used in the preparation of the multi-phase structure thermoplastic resin. Said preparation will be discussed afterward.

Typical examples of the vinyl polymer and copolymer in the multi-phase structure thermoplastic resin include polymers and copolymers prepared by polymerizing one or more of vinyl monomers such as vinyl aromatic monomers, for example, styrene, nucleus-substituted styrenes such as methyl styrene, dimethyl styrene, ethyl styrene, isopropyl styrene and chlorostyrene, and α-substituted styrene such as α-methylstyrene and α-ethylstyrene; acrylate and methacrylate monomers, for example, alkyl esters having 1 to 7 carbon atoms of acrylic acid or methacrylic acid such as methyl, ethyl, propyl, isopropyl and butyl acrylate and methacrylate; acrylonitrile and methacrylonitrile monomers; vinyl ester monomers such as vinyl acetate and vinyl propionate.

Further, halogenated vinyl or vinylidene monomers, most preferably vinyl chloride or vinylidene chloride, vinyl naphthalene, vinyl carbazole, acrylamide, methacrylamide, maleic anhydride, phenyl maleimide, cyclohexyl maleimide, other vinyl-type monomers, and mixtures thereof may be employed.

Conjugated diene monomers such as butadiene may not be employed, because they may cause poor weatherability of the vinyl polymer and copolymer.

Most preferably vinyl monomers in abovementioned vinyl monomers are styrene, methyl acrylate, ethyl acrylate, methyl methacrylate, ethyl methacrylate, methacrylonitrile, and as examples of the vinyl polymers and copolymers made from these monomers, styrene polymer, methyl methacrylate polymer, acrylonitrile-styrene copolymer, acrylonitrile-ethyl acrylate-styrene copolymer are listed.

The multi-phase structure thermoplastic resin used in the present invention is a propylene polymer matrix or a vinyl polymer or copolymer matrix in which another vinyl polymer or copolymer or propylene polymer is uniformly dispersed in a spherical form.

The polymer dispersed in the matrix has a particle diameter of 0.001 to 10 μm, preferably 0.01 to 5 μm.

When the particle diameter of the dispersed polymer is less than 0.001 μm or is more than about 10 μm, compatibility of the multi-phase resin with a propylene polymer and a vinyl polymer is poor, with the result that, for example, the appearance of molded articles made from the present composition deteriorates, the impact resistance reduces, or the improvement effect of coating properties is insufficient.

The vinyl polymer or copolymer in the multi-phase structure thermoplastic resin used in the present invention has a number average polymerization degree of 5 to 10,000, preferably 10 to 5,000.

When the number of average polymerization degree is less than 5, the improvement effect of coating properties is insufficient, and inversely, when it is in excess of 10,000, melting viscosity is high, moldability deteriorates, and surface luster of molded articeles falls off.

The multi-phase structure thermoplastic resin used in the present invention comprises 5 to 95% by weight, preferably 20 to 90% by weight, of a propylene polymer. Therefore, the content of a vinyl polymer or copolymer is 95 to 5% by weight, preferably 80 to 10% by weight.

When the content of the propylene polymer is less than 5% by weight, compatibility of the multi-phase resin is insufficient, and inversely, when it is in excess of 95% by weight, the improvement effect of coating and adhering properties of molded articles are insufficient.

As a grafting technique used to prepare the multi-phase structure thermoplastic resin regarding the present invention, there may be employed a well known process such as a chain transfer process and an ionizing radiation process, but the following process is most preferable, because grafting efficiency is high, secondary cohesion due to heat does not occur, and therefore performance can be exerted effectively.

Now, a method for preparing the thermoplastic resin composition of the present invention will be described in detail.

That is, 100 parts by weight of a propylene polymer is suspended in water. Separately, in 5 to 400 parts by weight of at least one vinyl monomer were dissolved 0.1 to 10 parts by weight, based on 100 parts by weight of the vinyl monomer, of one or a mixture of radical polymerizable organic peroxides represented by the undermentioned general formula (a) or (b) and 0.01 to 5 parts by weight, based on 100 parts by weight of the total of the vinyl monomer and the radical polymerizable copolymerizable organic peroxide, of a radical polymerization initiator in which a decomposition temperature of said initiator to obtain a half period of 10 hours is from 40° to 90° C., and the resulting solution is then added to the aqueous resin suspension. The mixture is then heated under conditions that the decomposition of the radical polymerization initiator does not occur substantially, in order to impregnate the propylene polymer with the vinyl monomer, the radical polymerizable organic peroxide and the radical polymerization initiator. When the impregnation ratio has reached 50% by weight or more of the original total weight of the monomer, peroxide and initiator, the temperature of this aqueous suspension is raised to copolymerize the vinyl monomer with the radical polymerizable or copolymerizable organic peroxide in the propylene polymer, thereby obtaining a graft polymerization precursor (A).

This graft polymerization precursor (A) also is the multi-phase structure thermoplastic resin. Therefore, the thus obtained graft polymerization precursor (A) may be directly melted and mixed with a polypropylene resin (I).

Furthermore, the multi-phase thermoplastic resin (III) of the resent invention can be obtained by kneading the graft polymerization precursor (A) under melting at 100° to 300° C.

Alternatively, the propylene polymer (I) or the vinyl polymer or copolymer (II) may be mixed with the graft polymerization precursor (A), and the mixture may be then kneaded under melting to obtain the multi-phase structure thermoplastic resin (III).

The most preferable multi-phase structure thermoplastic resin (III) can be obtained by kneading the graft polymerization precursor (A).

The above-mentioned radical polymerizable organic peroxides are compounds represented by the general formulae (a) or (b):

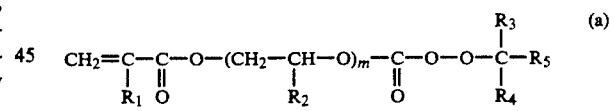

wherein $R_1$ is a hydrogen atom or an alkyl group having 1 or 2 carbon atoms, $R_2$ is a hydrogen atom or a methyl group, each of $R_3$, $R_4$ is an alkyl group having 1 to 4 carbon atoms, and $R_5$ is an alkyl group having 1 to 12 carbon atoms, a phenyl group, an alkyl-substituted phenyl group or a cycloalkyl group having 3 to 12 carbon atoms, m is 1 or 2.

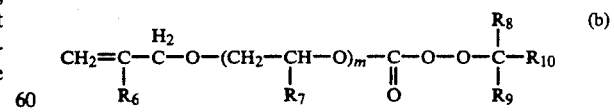

wherein $R_6$ is a hydrogen atom or an alkyl group having 1 to 4 carbon atoms, $R_7$ is a hydrogen atom or a methyl group, each of $R_8$, $R_9$ is an alkyl group having 1 to 4 carbon atoms, and each of $R_5$, $R_{10}$ is an alkyl group having 1 to 12 carbon atoms, a phenyl group, an alkyl-substituted phenyl group or a cycloalkyl group having 3 to 12 carbon atoms, n is 0, 1 or 2.

Typical examples of the radical polymerizable or copolymeraizable organic peroxides represented by the general formula (a) include t-butylperoxyacryloyloxyethyl carbonate, t-amylperoxyacryloyloxyethyl carbonate, t-hexylperoxyacryloyloxyethyl carbonate, 1,1,3,3-tetramethylbutylperoxyacryloyloxyethyl carbonate, cumylperoxyacryloyloxyethyl carbonate, p-isopropylperoxyacryloyloxyethyl carbonate, t-butylperoxymethacryloyloxyethyl carbonate, t-amylperoxymethacryloyloxyethyl carbonate, t-hexylperoxymethacryloyloxyethyl carbonate, 1,1,3,3-tetramethylbutylperoxymethacryloyloxyethyl carbonate, cumylperoxymethacryloyloxyethyl carbonate, t-isopropylcumylperoxymethacryloyloxyethyl carbonate, t-butylperoxyacryloyloxyethoxyethyl carbonate, t-amylperoxyacryloyloxyethoxyethyl carbonate, t-hexylperoxyacryloyloxyethoxyethyl carbonate, 1,1,3,3-tetramethylbutylperoxyacryloyloxyethoxyethyl carbonate, cumyperoxyacryloyloxyethoxyethyl carbonate, p-isopropylperoxyacryloyloxyethoxyethyl carbonate, t-butylperoxymethacryloyloxyethoxyethyl carbonate, t-amylperoxymethacryloyloxyethoxyethyl carbonate, t-hexylperoxymethacryloyloxyethoxyethyl carbonate, 1,1,3,3-tetramethylbutylperoxymethacryloyloxyethoxyethyl carbonate, cumylperoxymethacryloyloxyethoxyethyl carbonate, p-isopropylperoxymethacryloyloxyethoxyethyl carbonate, t-butylperoxyacryloyloxyisopropyl carbonate, t-amylperoxyacryloyloxyisopropyl carbonate, t-hexylperoxyacryloyloxyisopropyl carbonate, 1,1,3,3-tetramethylbutylperoxyacryloyloxyisopropyl carbonate, cumylperoxyacryloyloxyisopropyl carbonate, p-isopropylperoxyacryloyloxyisopropyl carbonate, t-butylperoxymethacryloyloxyisopropyl carbonate, t-amylperoxymethacryloyloxyisopropyl carbonate, t-hexyperoxymethacryloyloxyisopropyl carbonate, 1,1,3,3-tetramethylbutylperoxymethacryloyloxyisopropyl carbonate, cumylperoxymethacryloyloxyisopropyl carbonate, p-isopropylperoxymethacryloyloxyisopropyl carbonate.

Typical examples of the compounds represented by the general formula (b) include t-butylperoxyallyl carbonate, t-amylperoxyallyl carbonate, t-hexylperoxyallyl carbonate, 1,1,3,3-tetramethylbutylperoxyallyl carbonate, p-menthaneperoxyallyl carbonate, cumylperoxyallyl carbonate, t-butylperoxymethallyl carbonate, t-amylperoxymethallyl carbonate, t-hexylperoxymethallyl carbonate, 1,1,3,3-tetramethylbutylperoxymethallyl carbonate, p-menthaneperoxymethallyl carbonate, cumylperoxymethallyl carbonate, t-butylperoxyallyloxyethyl carbonate, t-amylperoxyallyloxyethyl carbonate, t-butylperoxymethallyloxyethyl carbonate, t-amylperoxymethallyloxyethyl carbonate, t-hexylperoxymethallyloxyethyl carbonate, t-butylperoxyallyloxyisopropyl carbonate, t-amylperoxyallyloxyisopropyl carbonate, t-hexylperoxyallyloxyisopropyl carbonate, t-butylperoxymethallyloxyisopropyl carbonate, t-amylperoxymethallyloxyisopropyl carbonate, t-hexylperoxymethallyloxyisopropyl carbonate.

Of these compounds, preferable ones are t-butylperoxyacryloyloxyethyl carbonate, t-butylperoxymethacryloyloxyethyl carbonate, t-butylperoxyallyl carbonate and t-butylperoxymethallyl carbonate.

In order to improve further impact resistance of the present compositions, a thermoplastic elastomer (IV) may be blended in an amount of 1 to 100 parts by weight based on 100 parts of the resin components (I)+(II)+(III). Examples of the thermoplastic elastomer (IV) include diene rubbers such as polybutadiene, styrene-butadiene copolymer, acrylonitrile-butadiene copolymer, polyisoprene; nondiene rubbers such as ethylene-α-olefin-polyene copolymer; styrene-butadiene block copolymer, hydrogenated styrenebutadiene block copolymer, ethylene-propylene elastomer, styrene-grafted ethylene-propylene elastomer, ethylene-type ionomer resin, hydrogenated styrene-isoprene block copolymer, and mixtures thereof.

In order to improve further heat durability of the present compositions, an inorganic filler (v) may be blended in an amount of 1 to 150 parts by weight based on 100 parts of the resin components (I)+(II)+(III) or (I)+(II)+(III)+(IV).

The inorganic filler (v) may be used in granular, lamellar, scaly, needle, spherical, balloons and fibrous forms, and examples of these inorganic fillers include granular fillers such as calcium sulfate, calcium silicate, clay, diatomaceous earth, talc, alumina, siliceous sand, glass powder, iron oxide, metallic powder, graphite, silicon carbide, silicon nitride, silica, boron nitride, aluminum nitride and carbon black; lamellar and scaly fillers such as mica, glass plate, sericite, pyrophyllite, metallic foil, for example, aluminum flake, and graphite; balloon fillers such as Shirasu balloon, metallic balloon, glass balloon and pumice; and mineral fibers such as glass fiber, carbon fiber, graphite fiber, whisker, metallic fiber, silicon carbide fiber, asbestos and wollastonite.

When the content of the filler is in excess of 150 parts by weight, the impact strength of molded articles deteriorates unpreferably.

The surface of the inorganic filler is preferably treated by the use of stearic acid, oleic acid, palmitic acid or a metallic salt thereof, paraffin wax, polyethylene wax or a modified material thereof, an organic silane, an organic borane or an organic titanate.

The thermoplastic composition of the present invention may be manufactured by melting and mixing the above-mentioned components comprising essentially (I)+(II)+(III) at a temperature of 150° to 300° C.

When the temperature is less than about 150° C., melting is insufficient, and the melt viscosity becomes unpreferably high, resulting in a separation or delamination of layers in molded articles, and inversely, when it is in excess of 300° C., decomposition or gelation of resins to be blended occurs.

In melting and mixing, there may be employed a conventional kneader such as a mixing roll mill, a Banbury mixer, a kneader mixer, a kneading extruder, a biaxial extruder and mixing rolls.

In the present invention, various additives may be used, insofar as they do not deviate from the gist of the present invention.

Examples of such usable additives include an inorganic flame retardant such as magnesium hydroxide or aluminum hydroxide, a usual halogen or phosphorus-series organic flame retardant; an antioxidant, an ultraviolet inhibitor, a lubricant, a dispersant, a coupling agent, a foaming agent, a crosslinking agent, a colorant; other thermoplastic resins such as polyolefin resins; an engineering plastics such as aromatic polyester resin, polyphenylene ether resin, polyamide resin, polycarbonate resin, polyoxymethylene resin, or polyphenylene sulfide resin.

Now, the present invention will be described in detail in reference to examples.

REFERENTIAL EXAMPLE 1

Preparation of Multi-phase Structure Thermoplastic Resin IIIA

In a 5-liter stainless steel autoclave was placed 2,500 g of pure water, and 2.5 g of polyvinyl alcohol was dissolved therein as a suspending agent. In the solution was placed 700 g of propylene polymer (trade name NISSEKI POLYPRO J 650 G; made by Nippon Petrochemicals Co., Ltd.) (which was denoted by PP in tables), followed by stirring to suspend the polymer therein. Separately, in 300 g of styrene as a vinyl monomer were dissolved 1.5 g of benzoyl peroxide as a radical polymerization initiator (trade name Nyper-B; made by Nippon Oils & Fats Co., Ltd.) and 6 g of t-butyl-peroxymethacryloyloxyethyl carbonate as a radical polymerizable organic peroxide, and the resulting solution was then placed in the above-mentioned autoclave, followed by stirring.

Afterward, the autoclave was heated up to a temperature of 60° to 65° C., and stirring was then continued for 2 hours, so that the propylene polymer was impregnated with the vinyl monomer containing the radical polymerization initiator and the radical polymerizable organic peroxide. After it had been confirmed that the total amount of the impregnated vinyl monomer, radical polymerizable organic peroxide and radical polymerization initiator was 50% by weight or more of the original total weight thereof, the temperature of the mixture was raised up to a level of 80° to 85° C., and this temperature was maintained for 7 hours to complete polymerization, followed by water washing and drying, thereby obtaining a graft polymerization precursor (A). The polystyrene was extracted from this graft polymerization precursor with ethyl acetate, and according to measurement by the use of GPC, the number average polymerization degree of the polystyrene in said precursor (A) was 900.

Next, this graft polymerization precursor was extruded at 200° C. by a plastomill monoaxial extruder (Tokyo Seiki Seisaku-sho Ltd.) to perform graft reaction, thereby obtaining a multi-phase structure thermoplastic resin IIIA. This multi-phase structure thermoplastic resin IIIA was then observed by a scanning-type electron microscope (trade name JEOL JSM T300; made by JEOL, Ltd.), and it was found that it was a multi-phase structure thermoplastic resin in which spherical polymer particles each having a diameter of 0.3 to 0.5 μm were uniformly dispersed. In this case, the grafting efficiency of the polystyrene was 55% by weight.

REFERENTIAL EXAMPLE 2

Preparation of Multi-phase Structure Thermoplastic Resin IIIB

The same procedure as in Referential Example 1 was repeated with the exception that 300 g of styrene as a vinyl monomer was replaced with a mixed monomer consisting of 210 g of styrene monomer and 90 g of acrylonitrile, and 1.5 g of benzoylperoxide was replaced with 3 g of di-3,5,5-trimethyl-hexanoylperoxide (trade name Perloyl 355; made by Nippon Oils & Fats Co., Ltd.), and 0.3 g of α-methylstyrene dimer (trade name NOFMER MSD; made by Nippon Oils & Fats Co., Ltd.) as a molecular weight modifier was used, thereby preparing a multi-phase structure thermoplastic resin IIIB. The average polymerization degree of the styrene-acrylonitrile copolymer was 1,200, and the average diameter of the polymer particles dispersed in this resin composition was from 0.3 to 0.5 μm.

EXAMPLES 1 TO 7

Propylene polymer (trade name NISSEKI POLYPRO J 650 G; made by Nippon Petrochemicals Co., Ltd.), polystyrene (which was denoted by PS in tables)(trade name DIAREX HF55; made by Mitsubishi Monsanto-Kasei Co. Ltd.), and the multi-phase structure thermoplastic resin obtained in Reference Examples were melted and blended together in ratios in Table 1.

In melting and mixing the materials, they were first dry blended with one another and were then fed to a one-direction rotating diaxial extruder having a screw diameter of 30 mm wherein a temperature of the screw was set to 230° C. Afterward, the mixture was extruded and then formed into grains.

Next, specimens were prepared therefrom by an injection molding machine. Sizes of the specimens were as follows:

| | |
|---|---|
| Specimens for notched izod impact strength | 13 mm × 65 mm × 6 mm |
| Specimens for heat distortion temperature | 13 mm × 130 mm × 6 mm |

Test procedures are as follows.

| | |
|---|---|
| (1) Notched izod impact strength: | JIS K7110 |
| (2) Heat distortion temperature: | JIS K7207 |

(3) Adhering properties:

After spray application of acrylic paints to test panels, the painted test panels were scribed on one face thereof with 11 vertical scribe lines at 1 mm intervals passing through the organic coatings to the base substrate, thereby scribing a lattice having 100 squares with a 1 mm side each. An adhesive tape (made by Nichiban Co., Ltd.) was stuck and was then suddenly removed therefrom and the number of remaining squares unpeeled is reported.

(4) Weather resistance:

Impact strength of a specimen which was treated in a Sunshine weatherometer for 500 hours is reported.

COMPARATIVE EXAMPLES 1 TO 6

The same procedure as in Examples 1 to 7 was repeated with the exception that the multi-phase structure thermoplastic resin IIIA was omitted, or the polystyrene was replaced with ABS resin (trade name STYLAC-ABS 101; made by Asahi-Kasei Co., Ltd.). The test results are shown in Table 2.

EXAMPLES 8 TO 15

In Example 11 or 12, the multi-phase structure thermoplastic resin IIIA was replaced with the graft polymerization precursor (A) obtained in Referential Examples. In Example 8, 9 or 10, a glass fiber having an average length of 5.0 mm with an average diameter of 10 μm was blended thereto. Further, in Example 13, 14 or 15, an ethylene-propylene copolymer (EPR) (trade name EPO 2P; made by Japan Synthetic Rubber Co., Ltd.) or a talc (trade name LMS-200; made by Fuji Talc Kogyo Co., Ltd.) was blended. The results are set forth in Table 3.

TABLE 1

| Example No. | 1 | 2 | 3 | 4 | 5 | 6 | 7 |
|---|---|---|---|---|---|---|---|
| Propylene polymer (% by wt.) | 90 | 80 | 80 | 80 | 70 | 50 | 50 |
| Polystyrene (% by wt.) | 10 | 20 | 20 | 20 | 30 | 50 | 50 |
| Multi-phase structure thermoplastic resin IIIA[1] (parts by wt.) | 5 | 5 | 10 | — | 10 | 10 | — |
| Multi-phase structure thermoplastic resin IIIB[1] (parts by wt.) | — | — | — | 10 | — | — | 20 |
| Notched izod impact strength (kg · cm/cm) | 9 | 9 | 10 | 9 | 10 | 8 | 9 |
| Notched izod impact strength (kg · cm/cm) after treatment in a weatherometer for 500 hr. | 9 | 8 | 9 | 8 | 8 | 6 | 7 |
| Heat distortion temperature (°C.) (18.6 kg/cm$^2$) | 114 | 113 | 111 | 112 | 115 | 108 | 107 |
| Adhering properties | 100 | 100 | 100 | 100 | 100 | 100 | 100 |

[1] parts by weight based on 100 parts by weight of (PP + PS)

TABLE 2

| Comparative Example No. | 1 | 2 | 3 | 4 | 5 | 6 |
|---|---|---|---|---|---|---|
| Propylene polymer (% by wt.) | 0 | 100 | 90 | 80 | 80 | 50 |
| Polystyrene (% by wt.) | 100 | 0 | 10 | 20 | — | — |
| Acrylonitrile-styrene copolymer (% by wt.) | — | — | — | — | 20 | — |
| ABS resin (% by wt.) | — | — | — | — | — | 50 |
| Multi-phase structure thermoplastic resin IIIB[1] (parts by wt.) | — | — | — | — | — | 20 |
| Notched izod impact strength (kg · cm/cm) | 2 | 7 | 3 | 2 | 3 | 12 |
| Notched izod impact strength (kg · cm/cm) after treatment in a weatherometer for 500 hr. | 2 | 5 | 2 | 2 | 2 | 3 |
| Heat distortion temperature (°C.) (18.6 kg/cm$^2$) | 93 | 113 | 82 | 76 | 78 | 110 |
| Adhering properties | 100 | 0 | 60 | 80 | 90 | 100 |

[1] parts by weight based on 100 parts by weight of (PP + ABS)

TABLE 3

| Example No. | 8 | 9 | 10 | 11 | 12 | 13 | 14 | 15 |
|---|---|---|---|---|---|---|---|---|
| Propylene polymer (% by wt.) | 80 | 80 | 50 | 80 | 50 | 50 | 50 | 50 |
| Polystyrene (% by wt.) | 20 | 20 | 50 | 20 | 50 | 50 | 50 | 50 |
| Multi-phase structure thermoplastic resin IIIA[1] (parts by wt.) | 5 | 10 | 20 | — | — | 10 | 10 | 10 |
| Graft polymerization precursor (A)[1] (parts by wt.) | — | — | — | 10 | 20 | — | — | — |
| EPR[2] (parts by wt.) | — | — | — | — | — | 20 | — | 20 |
| Glass fiber[3] (parts by wt.) | 20 | 20 | 20 | — | — | — | — | — |
| Talc[3] (parts by wt.) | — | — | — | — | — | — | 30 | 30 |
| Notched izod impact strength (kg · cm/cm) | 11 | 12 | 10 | 8 | 8 | 27 | 15 | 28 |
| Notched izod impact strength (kg · cm/cm) after treatment in a weatherometer for 500 hr. | 10 | 10 | 9 | 7 | 7 | 24 | 13 | 26 |
| Heat distortion temperature (°C.) | 138 | 140 | 133 | 111 | 106 | 110 | 139 | 135 |
| Adhering properties | 100 | 100 | 100 | 100 | 100 | 100 | 100 | 100 |

[1] parts by weight based on 100 parts by weight of (PP + PS),
[2] parts by weight based on 100 parts by weight of (PP + PS + IIIA),
[3] parts by weight based on 100 parts by weight of resin As described in the above-mentioned examples, the thermoplastic resin composition of the present invention, which has been prepared by using a specific multi-phase structure thermoplastic resin can provide various molded articles which are excellent in impact strength, heat stability, coating properties and weather resistance, while in the compositions of Comparative Examples the compatibility is insufficient, and the impact strength lowers.

What is claimed is:

1. A thermoplastic resin composition which comprises
   (I) 90 to 50% by weight of a propylene polymer other than (III), and
   (II) 10 to 50% by weight of polystyrene other than (III), and
   (III) 5 to 20 parts by weight, based on 100 parts by weight of the aforesaid resins (I)+(II), of a preformed compatibility agent which is a multiphase structure thermoplastic resin which is a graft copolymer comprising 20 to 90% by weight of a propylene polymer and 80 to 10% by weight of polystyrene or copolymer of styrene and acrylonitrile, one of the components being formed as a dispersion phase having a particle diameter of 0.001 to 10 μm, said graft copolymer being obtained by melting and kneading a graft polymerization precursor (A) which is prepared by copolymerizing styrene or styrene and acrylonitrile with at least one of radical polymerizable peroxides having the formulae (a) or (b)

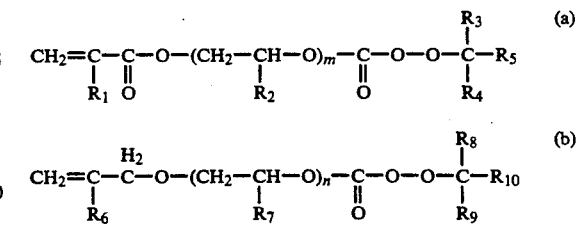

wherein $R_1$ is a hydrogen atom or an alkyl group having 1 or 2 carbon atoms, each of $R_2$ and $R_7$ is a hydrogen atom or a methyl group, $R_6$ is a hydrogen atom or an alkyl group having 1 to 4 carbon atoms, each of $R_3$, $R_4$, $R_8$ and $R_9$ is an alkyl group having 1 to 4 carbon atoms, each of $R_5$ and $R_{10}$ is an alkyl group having 1 to 12 carbon atoms, a phenyl group, an alkyl-substituted phenyl group or a cycloalkyl group having 3 to 12 carbon atoms, m is 1 or 2, and n is 0, 1 or 2,
in particles of a propylene polymer.

2. A thermoplastic resin composition according to claim 1 wherein the polystyrene or copolymer of styrene and acrylonitrile in the multiphase structure thermoplastic resin (III) has an average polymerization degree of 5 to 10,000.

3. A thermoplastic resin composition according to claim 1 wherein the propylene polymer is a crystalline polymer or copolymer composed of over 75% by weight of propylene.

4. A thermoplastic resin composition according to claim 1 in which a thermoplastic elastomer (IV) is blended in an amount of from 1 to 100 parts by weight based on 100 parts by weight of the resin composition (I)+(II)+(III).

5. A thermoplastic resin composition according to claim 1 in which an inorganic filler is blended in an amount of from 1 to 150 parts by weight based on 100 parts by weight of the resin composition (I)+(II)+(III).

6. A thermoplastic resin composition according to claim 1 in which the propylene polymer in resin (III) is polypropylene.

7. A thermoplastic resin composition according to claim 6 in which the propylene polymer (I) is polypropylene.

* * * * *